Figure 1:
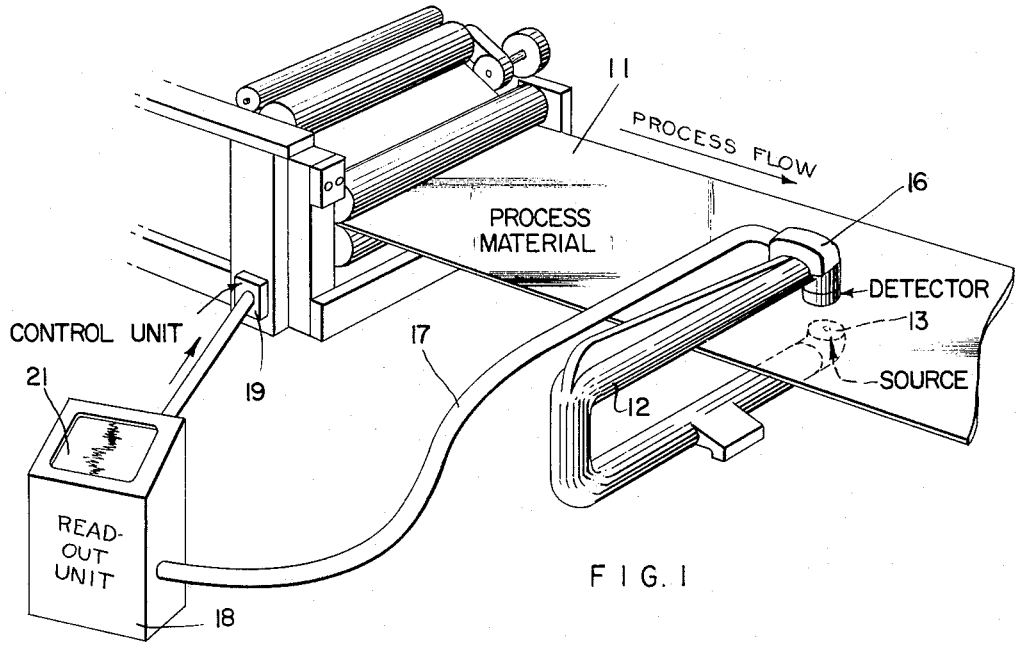

INVENTOR.
CARL W. HANSEN

United States Patent Office 3,248,545
Patented Apr. 26, 1966

3,248,545
RADIATION GAUGE SYSTEM WITH CONTROLS
Carl Woodrow Hansen, Wayland, Mass., assignor to Laboratory for Electronics, Inc., Boston, Mass., a corporation of Delaware
Filed May 29, 1962, Ser. No. 198,602
4 Claims. (Cl. 250—83.3)

This invention relates in general to process control and more particularly to a measurement system in which a radiation gauge is coupled through a servo motor to a process control unit and strip chart recorder.

The use of radiation gauges as transducers in a process control system is now a well developed art. In its usual form, the radiation gauge, which includes a radiation source such as a beta ray source and a suitable detector such as an ionization chamber, is located on a process line and connected through cables to a control and readout console located at some distance from the actual point of measurement. In the readout console, the signals from the radiation detector are usually presented on a strip chart recorder, and, in the case of an automatic control system, the signals are additionally supplied to a control circuit which generates a correction signal to maintain the measured quantity in the process within predetermined limits.

One of the more serious problems in the operation of such a system arises from the nature of the signal provided as an output from the usual radiation detector, such as an ionization chamber. The signal provided from an ionization chamber is a very low level current signal. This signal must be transmitted over a considerable length of cable, which may sometimes be as long as two hundred and fifty feet, and then used at the console end to drive a strip chart recorder.

In one method, which has been previously used, a high resistance is coupled in series with the ionization chamber and the voltage difference between the resistor and a bridge voltage was amplified by a direct current amplifier. Direct current amplifiers, however, have an inherent drift problem, and hence systems employing these required frequent standardizations.

In another method which has been previously employed, the difference voltage between the high resistance and the bridge voltage was applied across a vibrating capacitor, thereby generating an A.C. voltage. The A.C. voltage was, in turn, amplified in an A.C. amplifier (thus avoiding the drift problem). The vibrating capacitor was driven at a frequency of 140 cycles per second in order to avoid the cable noise pickup which was predominantly at a frequency of 60 cycles per second. At the console end of the cable, the signal was again amplified. However, the servo-motor which drives the available commercial strip chart recorders is designed to operate at a frequency of 60 cycles per second, and hence the 140-cycle-per-second signal from the radiation gauge head was converted to a 60-cycle signal. This was accomplished by feeding the 140-cycle signal from the cables into a phase sensitive rectifier generating a voltage proportional in amplitude and polarity to the error signal. This D.C. signal in the console was then applied to a modulation circuit which provided an alternating current output signal at 60 cycles per second with a magnitude and phase proportional to the D.C. error signal. This 60-cycle, A.C. signal was then in a form suitable for driving the servo-motor providing a graphical representation of the beta gauge signals.

It is the primary object of this invention provide a compact, rapid, and accurate system for producing from a radiation detector an output signal for controlling a servo-motor.

It is another object of this invention to provide apparatus capable of producing an output signal from a low level input signal obtained from a remotely located ionization chamber.

It is a further object of this invention to provide a signal which may be transmitted over a length of cable under favorable signal-to-noise conditions and yet will operate a servo-motor strip chart recorder.

Figure 2:
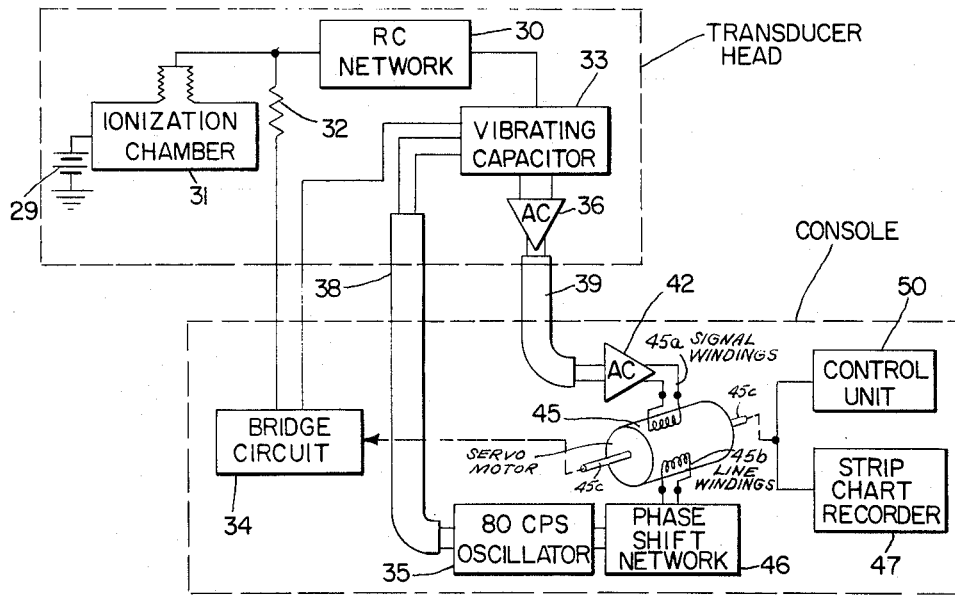

Other objects and many of the attendant advantages of the invention will be readily appreciated as the invention becomes better understood by reference to the following detailed description when considered in connection with the accompanying drawings wherein:

FIG. 1 is an illustration in perspective view of a process control system suitable for use in accordance with the principles of this invention; and FIG. 2 is an illustration in block diagrammatic form of a radiation gauge strip chart recorder system in accordance with the principles of this invention.

Referring now to FIG. 1, a process material 11 is shown flowing through the jaws of a radiation gauge 12 which includes a source 13 and detector 16. The radiation from source 13 passes through the process material to the detector head 16, which usually would be an ionization chamber, providing an electrical output signal proportional to the amount of radiation detected. The relative absorption of these radiations is a function of the thickness of the process material and hence the output voltage is proportional to the thickness of the process material also. The detector signal is coupled through cable 17 to a readout unit 18 which includes a strip chart recorder 21, providing a continuous indication of the thickness of the material as it flows through the radiation gauge 12. The readout unit 18 may also provide a control signal to a control element 19, thereby automatically maintaining the thickness of the processss material within some predetermined limits. In many industrial applications, the radiation gauge 12, which is located directly on the process line, must be separated by a considerable distance from the readout unit 18, with the result that the cable 17 from the detector to the readout unit may be 250 feet or longer.

With reference now to FIG. 2, there is illustrated in block diagrammatic form a radiation gauge system providing an output on a strip chart recorder located in a console. An ionization chamber 31 has a collecting voltage impressed across it from battery 29. The signal developed in the ionization chamber 31 is connected from the cathode of the ionization chamber to one end of a high resistance resistor 32 which typically might have a value of $10^{10}$ ohms. The other end of resistor 32 is connected to a bridge circuit 34. The cathode of the ionization chamber 31 is also connected through a resistance-capacity network 30 to a vibrating capacitor 33 which is driven at a vibration frequency of about 80 cycles per second by an oscillator 35. The output signal from the vibrating capacitor 33, which is an alternating current signal at a frequency of 80 cycles per second, is fed into a conventional alternating current amplifier 36.

With the exception of the oscillator 35 and bridge circuit 34, each of the above units is included within the "head" as indicated by the dotted line surrounding these units. The oscillator 35, together with the remainder of the units included in the system, are located in the console which is coupled to the head by a pair of cables 38 and 39. Cable 38 couples the oscillator to the capacitor and serves to provide the oscillator signals to vibrating capacitor 33.

The output signals from A.C. amplifier 36 are fed through cable 39, which, as indicated, may be 250 feet or longer, to the input of a second A.C. amplifier 42, which is physically located within the console unit. After amplification, the 80-cycle detector signals are applied to the signal windings 45a of a servo-motor 45. The line windings 45b of this same servo-motor 45 are driven from the 80-cycle oscillator 35 through a phase shift unit 46. The shaft 45c of the servo-motor 45 is used to drive a strip chart recorder 47 of the usual form and also to drive a slide wire in the bridge circuit 34. Since this is a null seeking device, the voltage that is applied to the vibrating capacitor 33 is the difference voltage between the bridge and the resistor 32. The phase relation of the signals between the vibrating capacitor 33 of the A.C. voltage applied to the line winding of servo-motor 45 is indicative of the direction the servo-motor 45 must drive to balance the bridge 34. In an automatic processing control system, the servo-motor may also provide the error signal to a control unit 50 which then generates an appropriate correction to be applied to the process.

Servo mechanical motors for operation of commercially available strip chart recorders are basically designed to operate at 60 cycles per second. However, operation at 60 cycles per second causes the servo-motor to respond to many spurious 60-cycle transients picked up by the cable and head, thereby providing improper error signals, and, in the case of automatic process control, improper correction signals and control functions. In the present system, however, the frequency of the reference signal applied to the line windings is 80 cycles per second; hence, the servo-motor responds only to signals that are substantially 80 cycles per second. It has been found that these servo mechanical motors function normally with signals of 80 cycles per second on both the line and signal windings. Since the amount of spurious noise at 80 cycles per second is greatly reduced from that of 60 cycles per second or harmonies thereof, a control system operating at this frequency is far less subject to errors in readout and control arising from spurious signals.

Having described the invention herein, it is apparent that many modifications and changes may now be made by those skilled in the art, and it is intended that the invention disclosed herein should be limited only by the spirit and scope of the appended claims.

What is claimed is:
1. Measurement apparatus comprising,
   detection means for producing an output signal;
   an oscillator adapted to provide an output signal at a frequency which is substantially 80 c.p.s.;
   a vibrating capacitor driven by said oscillator output signal at said oscillator output signal frequency;
   means for applying a portion of said detection means output signal to said vibrating capacitor, thereby modulating said portion of said output signal at 80 c.p.s.;
   a servo motor having the signal windings thereof directly excited by said amplified modulated output signal;
   a phase shifting network coupling said oscillator output signals into the line winding of said servo motor.

2. Apparatus for controlling a variable in a process comprising,
   a transducer adapted to provide direct current output signals indicative of the value of said variable;
   an oscillator for producing an output signal at substantially 80 cycles per second;
   a servo motor having a normal operating frequency of 60 cycles per second and including a pair of signal windings, a pair of line windings, and an output shaft;
   means coupling said oscillator output signal to said line windings;
   a vibrating capacitor;
   means for coupling a portion of said transducer output signal and said oscillator output signal to said vibrating capacitor thereby producing a modulated output signal from said vibrating capacitor;
   means for amplifying said modulated output signal and applying said modulated output signal to the signal windings of said servo motor;
   means responsive to the angular position of said servo mechanical motor output shaft, and adapted to control said variable in said process.

3. Measurement apparatus comprising,
   a radiation detector producing a direct current output signal varying in accordance with variations in incident radiation;
   an oscillator adapted to provide an output signal at a frequency which is substantially 80 cycles per second;
   a servo mechanical motor having signal windings, line windings, and an output shaft, the rotary position of said output shaft being responsive to differences in magnitude and phase between signals applied to said line windings and said signal windings;
   a vibrating capacitor driven by said oscillator output signal;
   means for applying a portion of said radiation detector output signal to said vibrating capacitor, thereby modulating said portion of said output signal at substantially 80 cycles per second;
   means for amplifying and coupling said modulated signal into said signal windings of said servo mechanical motor;
   means for coupling the output signal from said oscillator into said line windings of said servo mechanical motor;
   means responsive to the output shaft position of said servo mechanical motor for providing a visual indication of the value of said radiation detector signal.

4. Measuring apparatus comprising first and second separate housings; an oscillator, a servo-mechanical motor, an amplifying means and a coupling means included within said first housing, said oscillator being adapted to provide an output signal at a frequency which is substantially eighty cycles per second, said servo-mechanical motor having signal windings, line windings, and an output shaft, the rotary position of said output shaft being responsive to differences in magnitude and phase between signals applied to said line windings and said signal windings, said amplifying means having its output coupled to said signal windings of said servo-mechanical motor, said coupling means being arranged to connect the output signals of said oscillator to said line windings of said servo-mechanical motor; a radiation detector included within said second housing, said radiation detector producing a direct current output signal varying in accordance with variations in radiation incident thereon; a vibrating capacitor included within said second housing and means for applying a portion of said radiation detector output signals to said vibrating capacitor also included within said second housing; connecting means for connecting said first and said second housing such that said vibrating capacitor is driven by said oscillator output signal thereby modulating said portion of said output signal from said radiation detector at substantially eighty cycles per second; said connecting means also providing said modulated signal to the input of said amplifying means and means included within said first housing responsive to the output shaft position of said servo-mechanical motor for providing a visual indication of the value of said radiation detector signal.

References Cited by the Examiner
UNITED STATES PATENTS

| 2,467,812 | 4/1949 | Clapp | 250—83.3 |
| 2,800,590 | 7/1957 | Gilman | 250—83.3 |
| 2,937,276 | 5/1960 | Thourson | 250—43.5 |
| 2,968,727 | 1/1961 | Otis | 250—83.3 |
| 3,007,052 | 10/1961 | Hickman et al. | 250—83.3 |

RALPH G. NILSON, *Primary Examiner.*

ARCHIE R. BORCHELT, *Examiner.*